United States Patent [19]
Wentworth

[11] 4,372,742
[45] Feb. 8, 1983

[54] ARITHMETICAL TEACHING AID

[76] Inventor: Roland A. L. Wentworth, 1 Earls Ter., London W.8, 6 LP, England

[21] Appl. No.: 313,518

[22] Filed: Oct. 21, 1981

[51] Int. Cl.³ .......................................... G09B 19/02
[52] U.S. Cl. .................................. 434/199; 434/205; 434/207; 434/209; 434/210
[58] Field of Search ............... 434/191, 192, 200, 203, 434/204, 205, 207, 208, 209, 210, 199

[56] References Cited
U.S. PATENT DOCUMENTS

| | | | |
|---|---|---|---|
| 856,041 | 6/1907 | Dunn | 434/204 |
| 2,457,332 | 12/1948 | Wade et al. | 434/203 |
| 3,129,518 | 4/1964 | Burris | 434/210 |
| 3,280,480 | 10/1966 | Rice | 434/205 |
| 3,500,558 | 3/1970 | Matejczyk | 434/203 |

FOREIGN PATENT DOCUMENTS

| | | | |
|---|---|---|---|
| 22804 | of 1908 | United Kingdom | 434/210 |
| 29647 | of 1912 | United Kingdom | 434/199 |
| 313826 | 6/1929 | United Kingdom | 434/210 |
| 587220 | 4/1947 | United Kingdom | 434/204 |

*Primary Examiner*—William H. Grieb
*Attorney, Agent, or Firm*—Nolte and Nolte

[57] ABSTRACT

An arithmetical teaching aid includes a display board B comprising a rectangular array of display areas A arranged in rows R and columns C. Adjacent display areas A are marked (1, 10, 100 etc.) to represent successive powers of an arithmetic base number so that display areas A (where there are more than one) representing a given power of the base number (e.g. 1,000) are arranged diagonally across the board. Means (for example slides S) are provided for relatively moving the various rows R of display areas so that displays (e.g. 1,000) in the different rows R corresponding to the same power of the base number can be brought into columnar registration. All display areas A corresponding to a given power of the base number have a common tonal and/or textural characteristic which is different from the characteristic of each neighboring display area corresponding to a different power of the base number. Such characteristics are preferably provided by three different colors. The teaching aid further comprises sets of unit indicators (e.g. cubes) for display on the display areas A. Each unit indicator has a tonal and/or textural characteristic identifiable with that of a display area A on which it is to be placed.

10 Claims, 6 Drawing Figures

FIG.1

| | B | F | A | C | | S |
|---|---|---|---|---|---|---|
| | 100,000 | 10,000 | 1,000 | 100 | 10 | 1 | R
| | 1,000,000 | 100,000 | 10,000 | 1,000 | 100 | 10 |
| | 10,000,000 | 1,000,000 | 100,000 | 10,000 | 1,000 | 100 |
| | 100,000,000 | 10,000,000 | 1,000,000 | 100,000 | 10,000 | 1,000 |

FIG.2

| | | | T | | |
|---|---|---|---|---|---|
| 100 | 10 | 1 | 0.1 | 0.01 | 0.001 |
| 1,000 | 100 | 10 | 1 | 0.1 | 0.01 |
| 10,000 | 1,000 | 100 | 10 | 1 | 0.1 |
| 100,000 | 10,000 | 1,000 | 100 | 10 | 1 |

ARITHMETICAL TEACHING AID

This invention relates to an arithmetical teaching aid.

Many types of abacus are of course well known but they are used as teaching aids in addition and subtraction rather than multiplication and division since they do not readily lend themselves to a pictorial representation of the multiplication or division process.

It is an object of the present invention to provide an arithmetical teaching aid which is particularly adapted for use in multiplication and division but which can also be used for other operations, for example the extraction of square roots.

According to the present invention, there is provided an arithmetical teaching aid including a display board comprising a rectangular array of display areas arranged in columns and rows, adjacent display areas being marked to represent successive powers of an arithmetic base number so that display areas (where there are more than one) representing a given power of the base number are arranged diagonally across the board, means for relatively moving the various rows of area displays so that displays in the different rows corresponding to the same power of the base number can be brought into columnar registration, wherein all display areas corresponding to a given power of the base number have a common tonal and/or textural characteristic which is different from the characteristic of the or each neighbouring display area corresponding to a different power of the base number and wherein the teaching aid further comprises sets of unit indicators for display on said display areas each unit indicator having a tonal and/or textural characteristic indentifiable with a said display area on which it is to be placed.

It would be possible to make such a display board electronically operable, but for costs and other reasons the board is preferably manually operable and unit indicators are small objects which can be placed thereon rather than for example switchable display lights.

The tonal and/or textural characteristics referred to may take any desired form. For example different sized spots or different cross-hatchings or different monochrome shades may be applied to the different sets of display areas and their corresponding unit indicators. It is most preferred however for the tonal characteristics to be colours. Alternatively, different textural characteristics can be applied, and this would be of especial value in teaching the blind. Of course differently textured areas and blocks could also be differently coloured.

In accordance with the invention, there must be at least two identifiable pairs of tonal and/or textural characteristics, and it is of course within the scope of the invention for each power of the base number indicated on the display board to have its own unique characteristics. This however is not necessary and leads to an unduly large requirement for unit indicators.

Preferably there are three distinct identifiable pairs of tonal and/or textural characteristics of the display areas and unit indicators arranged to correspond with three successive powers of the base number. This provides additional teaching aid, since for example the 'unity' area(s) (base power zero) may be coloured yellow, the 'ten' areas (base power 1) may be coloured blue, and the 'hundred' area (base power 2) may be coloured red. Then, across the board, 'unity thousand' areas may be yellow, 'ten thousand' areas blue and 'hundred thousand' areas red. It is not necessary that a characteristic applied to the display area should be identical with that applied to the corresponding unit indicators, merely that they should be readily identifiable. Thus with reference to the colour examples given above, the unity unit indicators could be of a light uncoloured wood such as beech or boxwood which is readily identifiable with yellow while other wooden unit indicators are painted, dyed or stained red or blue as the case may be. Again a precise colour match between the reds (or blues) of the display areas and the reds (or blues) of the unit indicators is not important for practical purposes though it is aesthetically desirable.

Said unit indicators are preferably uniformly sized cubes. They may be wooden as aforesaid or of plastics or any other suitable material. In some circumstances, as when the aid is used for teaching the blind, it is desirable to incorporate some means tending to prevent accidental dislodgement of unit indicators placed on the board. To this end, each indicator may be provided with a peg for insertion in one of a plurality of holes in a display area, or the board may be magnetised for magnetic attraction of unit indicators, or vice versa.

The display areas are preferably square and of a uniform size, their sides corresponding to a whole number multiple of the length of an edge of the indicator cubes. This whole number multiple will correspond to the base number with which the board is most suited for use, and in use, when unit indicators are lined up along a side of a display square and fill that side, an indication is provided of the number of units to be 'carried' to an adjacent display square corresponding to a successively larger power of the base and of the number which may remain in that square if any.

Said whole number multiple is preferably ten which is most convenient for performing calculations according to base ten, while accommodating operations in any other base commonly used. For example when operating according to the duodecimal base one would have to remember to 'carry' unit indicators in groups to twelve or in the binary system in groups of two.

The display areas could be marked with the actual power of the base number to which they correspond, for example 0, 1, 2, 3, 4, 5 etc. but this is not preferred since it is presently thought that it would be confusing and it is also unsuitable for use in an arithmetical system whose base is equal to or lower than the highest digit used to indicate such power. It is much preferred that the various display areas are marked using the digits 0 and 1 only, thus for example: 1; 10; 1000; etc.

In some preferred embodiments of the invention, said display areas are marked in positive power and zero power only of the base number. Such teaching aids are suitable for whole number calculations. In other preferred embodiments of the invention, different display areas are marked in positive and negative powers of the base number thus providing a teaching aid suitable for introducing the multiplication of decimal fractions. Of course a single teaching aid may incorporate one display board of each of these types.

A teaching aid according to the invention preferably also comprises digitally marked counters for setting out problems and answers.

Preferred embodiments of the invention will now be described by way of example with reference to the accompanying drawings in which FIG. 1 is a plan view of a first display board in a frame;

FIG. 2 is a plan view of a second display board the frame being omitted;

Figure 3A:
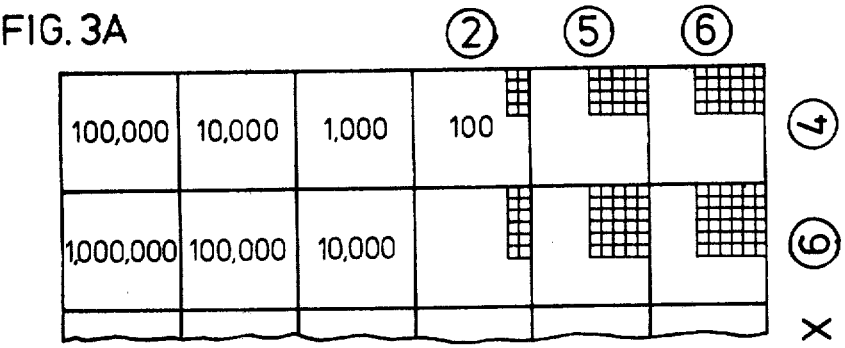
FIG. 3 illustrates three stages A, B and C in the multiplication of 256 by 64 using the display board of FIG. 1.

In FIG. 1, a teaching aid comprises a display board B held within a frame F. The display board B is rectangular and is divided into a plurality of rows R and columns C of display areas A which are square in shape. In fact there are four rows R and six columns C, this arrangement having been found most convenient in use.

Starting from a 'zero' position at the top right hand corner of the board each display area is marked so that the adjacent areas correspond with successive powers of an arithmetic base number. Thus in the first row the display areas are marked to correspond to powers 0, 1, 2, 3, 4 and 5 of the base number, that is as 1; 10; 1,000; 10,000 and 100,000. Likewise the first areas in the second, third and fourth rows are respectively marked 10; 100 and 1,000 and so on across the board.

It will be apparent that the base chosen need not be a decimal base. The markings indicated are equally suitable for arithmetical operations in other systems, for example in binary or duodecimal system or systems to any other base such as three or seven.

With this arrangement, the display areas A corresponding to any given power of the base run diagonally across the board.

Each row R of display areas A is mounted on a separate strip S of the display board in such a way that the three lowers rows can be slid out so that displays in those rows can be brought into columnar registration with corresponding displays of the same base power in the top row. In one particularly convenient arrangement, interengaging catches (not shown) are provided on the rear faces of the slides and so arranged that when the fourth row is slid out by a distance equal to one display area side, further movement of the fourth slide will carry the third slide with it and when the third slide has moved across one square, the second slide will in turn be moved across. Similarly hidden stop means may be provided to prevent any slide moving too far if desired.

In addition to the markings indicated in the drawings, neighbouring display areas representing different powers of the base have different tonal and/or textural characteristics. In practice it has been found that three distinct characteristics are best. Thus the squares may be marked as follows:

| Yellow: | 1, | 1,000, | 1,000,000 |
| Blue: | 10, | 10,000, | 10,000,000 |
| Red: | 100, | 100,000, | 100,000,000 |

As an alternative, the 'yellow' squares referred to above may be given a smooth surface finish, the 'blue' squares a rough surface finish and the 'red' squares a cloth or flock surface finish. All these differently textured squares could be of the same colour, but it would be better to achieve a combined textural and tonal differentiation, for example by using a yellow gloss paint, or a rough textured blue paint (for example of the non-slip type used on boat decks) or squares of red felt as appropriate.

The teaching aid also comprises sets of unit indicators which may be placed on the display board. These are not shown in FIG. 1 because the preferred form is simply that of a cube. One set of such cubes is provided to correspond identifiably with each display area characteristic. For example natural light coloured wooden cubes could correspond with the yellow square while other cubes are coloured red or blue.

In addition, sets of counters may optionally be supplied marked with the digits 0 to 9 for use in setting up problems to be solved and in finally giving the answer. Of course if the frame F is suitably painted one could simply use blackboard chalk.

FIG. 2 illustrates an alternative form of display board for use in introducing the notion of fractions, for example decimal fractions. The displays indicated may for example be applied to the reverse face of the display strips illustrated in FIG. 1.

Apart from the markings representing powers of the base, the display board may be identical with that shown in FIG. 1.

In FIG. 2, the display squares are marked with reference to a 'zero' position occupying the third square from the left in the top row, so that the top row is marked to represent base powers 2, 1, 0, −1, −2, −3 reading from left to right. As in FIG. 1, markings corresponding to the same power of the base run diagonally across the display. Also shown in FIG. 2 is an optional line T marking the transition between whole numbers and basal fractions.

Figure 3B:
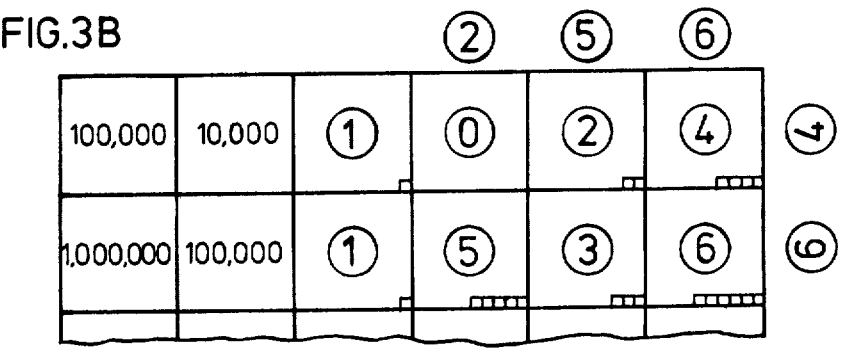
Figure 3C:
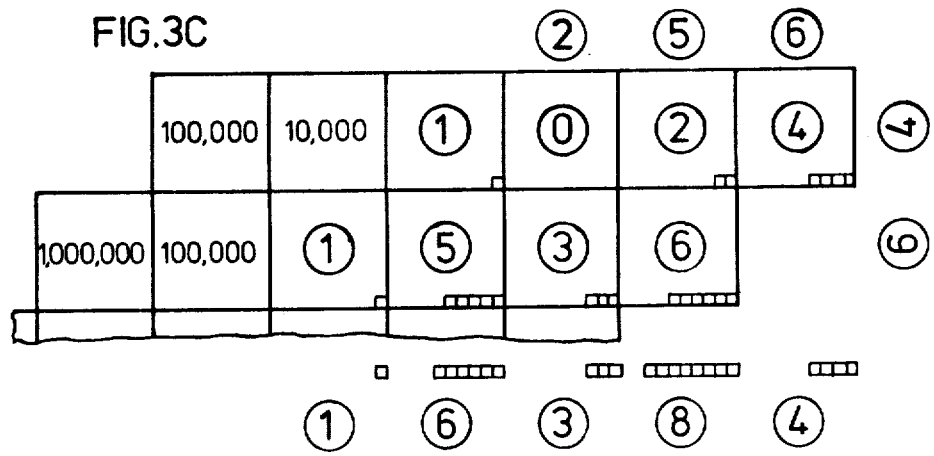

FIG. 3 illustrates the multiplication of 256 by 64 (decimal base) using a display board as shown in FIG. 1. In FIG. 3, most of the base power markings have been omitted. The problem may be initially set up by a teacher using counters marked 2, 5 and 6 positioned as shown adjacent the hundreds, ten and units display squares respectively of the first row and counters 6 and 4 positioned adjacent the tens and units display squares of the first column. The pupil then adds unit indicators (cubes) as appropriate.

Thus, in the first row, 256 is to be multiplied by 4 and accordingly in the yellow units display square the pupil places four rows each containing six yellow indicator cubes; in the blue tens display square, four rows each of five blue indicator cubes and in the red hundreds display square, four rows each of two red indicator cubes. In the second row where 256 is to be multiplied by 60, the pupil places six rows each of six blue indicator cubes in the blue tens square, six rows each of five red indicator cubes in the red hundreds square and six rows each of two yellow indicator cubes in the yellow thousands display square. This is the position indicated in FIG. 3 at A. It will be noted that the indicator cubes at this stage of the operation could all be brought together to form a rectangle by simple translation of five of the six sets of cubes and this provides a rapid visual check on the operation.

A next stage in the operation is indicated at B in FIG. 3. The cubes in the units square in the first row are brought down and lined up along the base of that square. Because the base of that square is ten times the base of the indicator cubes, there will be two full rows each of ten yellow cubes and one row of four yellow cubes. Each of the two full rows of yellow cubes is then removed and replaced by a single blue cube which is positioned in the adjacent blue tens display square of the first row. Similarly two rows of ten blue cubes are replaced by two red cubes placed in the hundreds square and ten red cubes are replaced by a yellow cube in the thousands square. The unit indicator cubes in the second row are rearranged in a similar fashion. At the end of this operation, the display board carries unit cubes arranged as shown at B in FIG. 3, that is to say as follows:

| Square: | Thousands (yellow) | Hundreds (red) | Tens (blue) | Units (yellow) |
|---|---|---|---|---|
| Row 1: | 1 yellow | 0 | 2 blue | 4 yellow |
| Square: | Ten thousands (blue) | Thousands (yellow) | Hundreds (red) | Tens (blue) |
| Row 2: | 1 blue | 5 yellow | 3 red | 6 blue |

The rows of display squares are then moved relative to one another as indicated at C in FIG. 3 so that the various display squares on the board representing any given power of the base (ten) are in vertical columnar registration, and the cubes are added together to give the required answers which may be indicated using counters marked with appropriate digits.

It is at this stage that the pupil may be encouraged to set down the working of the problem on paper, and it will be noted that the positioning of the cubes corresponds closely with the usual method of setting out a multiplication sum:

$$\begin{array}{r} 256 \times \\ \underline{64} \\ 1024 \\ \underline{1536} \\ 16384 \end{array}$$

Figure 4A:
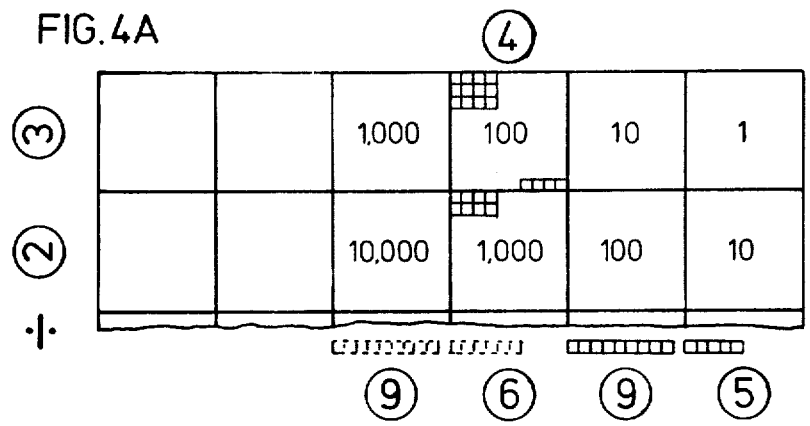
FIG. 4 illustrates three stages A, B and C in the division of 23 into 9695 using the display board of FIG. 1.
Figure 4B:
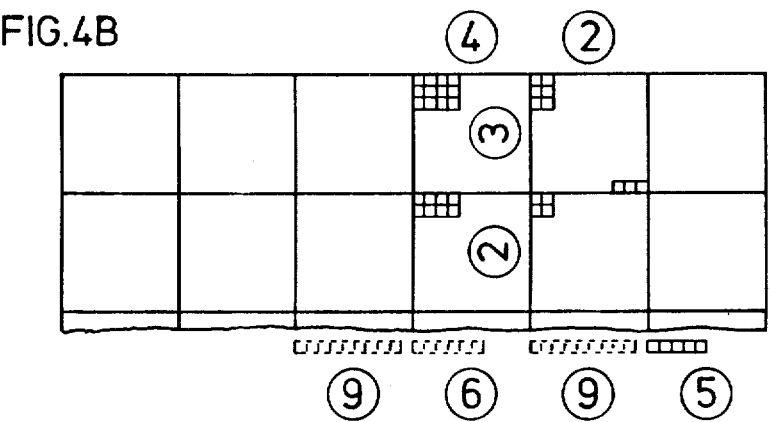
Figure 4C:
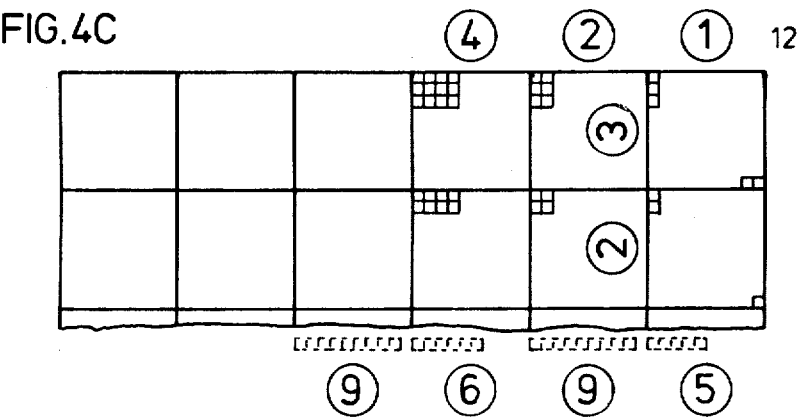

FIG. 4 illustrates the division of 9695 by 23 on a display board as illustrated in FIG. 1. The problem is set up as indicated diagrammatically at A with nine yellow cubes located on the frame beneath the yellow thousands square of the first row, six red cubes beneath the red hundreds square, nine blue cubes beneath the blue tens square and five yellow cubes beneath the yellow units square. The next step is to transfer the nine yellow thousands cubes to the appropriate square in the second row. Because 2 is to be divided into, or repeatedly subtracted from this row, it is convenient to arrange these nine cubes in four columns of two, and the remaining yellow thousands cube is then replaced by ten red hundreds cubes. These are arranged in four columns of three in the hundreds display square in the first row immediately above the thousands display square in the second row together with the other six red hundreds cubes, and it will be noted that there is a remainder of four red hundreds cubes. These four red cubes are transferred (in columns of two) to the red hundreds square in the second row, and the nine blue tens cubes are removed from the frame and arranged in columns of three above them. This is shown in FIG. 4B. The three odd blue cubes are then transferred to the blue tens square in the second row and the five yellow units cubes are arranged above them as illustrated at C in FIG. 3, and the answer is read off merely by counting the complete columns to give 421 with a remainder of one blue tens cube and two yellow units cubes or 12.

The teaching exercise may be completed by writing out the sum as follows:

$$23 \overline{\smash{)}96} = 4 \text{ rem } 4 \text{ remainder}$$
$$23 \overline{\smash{)}49} = 2 \text{ rem } 3 \text{ remainder}$$
$$23 \overline{\smash{)}35} = 1 \text{ rem } 12 \text{ remainder}$$

$$\begin{array}{r} 421 \text{ remainder } 12 \\ 23 \overline{\smash{)}9695} \\ 4 \times 23 \phantom{0} \underline{92} \\ 49 \\ 2 \times 23 \phantom{0} \underline{46} \\ 35 \\ 1 \times 23 \phantom{0} \underline{23} \\ \underline{\underline{12}} \end{array}$$

Figure 5A:
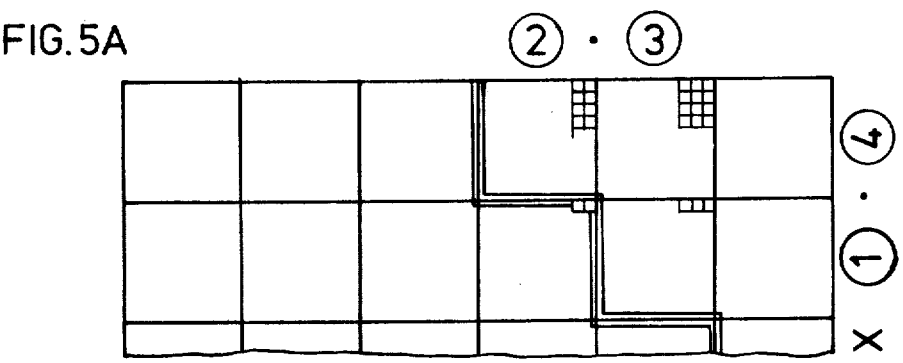
FIG. 5 illustrates three stages A, B and C in the multiplication of 2.3 by 1.4 using the display board of FIG. 2.
Figure 5B:
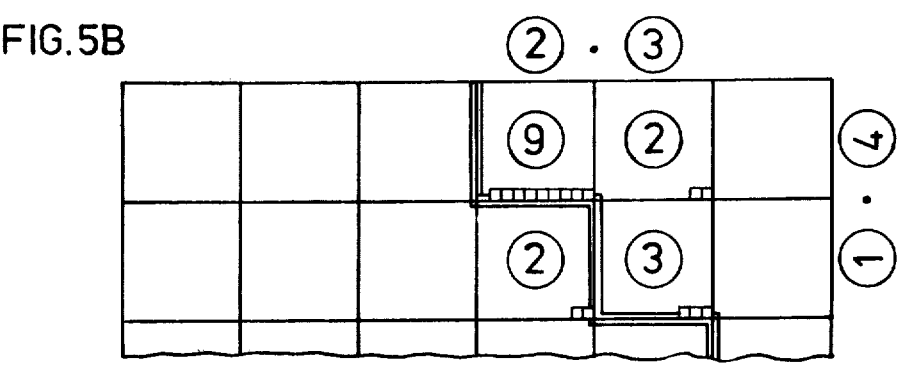
Figure 5C:
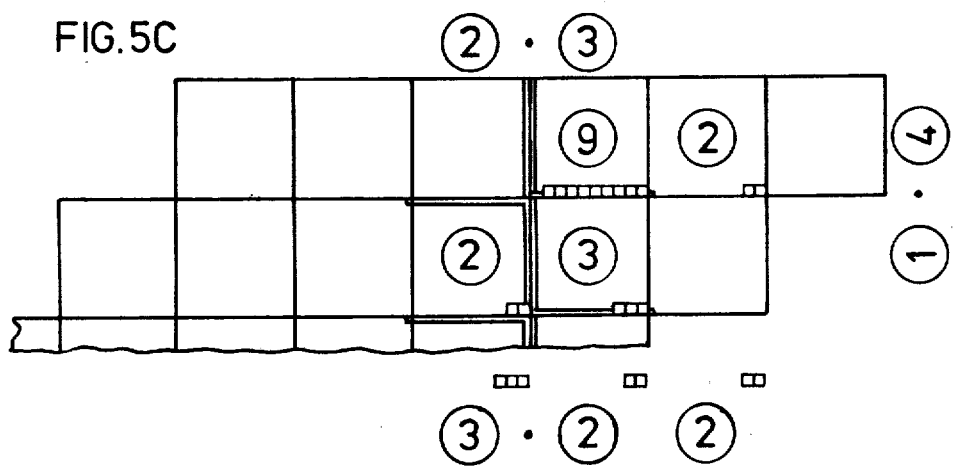

FIG. 5 illustrates the multiplication of nonintegral decimal numbers namely 2.3 and 1.4 using the display board of FIG. 2. The problem is set up in a way similar to that of FIG. 3, but is to be noted that the decimal point in the multiplier and multiplicand must be so arranged that the product of their unit digits falls in a units display square. The product is formed as shown at A in FIG. 5 by forming rows and columns of appropriate numbers of indicator cubes coloured to correspond with the display square in which they are located. The product is then rationalised row by row as shown at B, and the display board rows are relatively moved to the positions shown at C so that the transition line T between the units and decimals is a straight vertical line and all the display squares indicating a given power of the base (ten) are in columnar registration. The unit cubes in the display board columns are then summed to give the answer.

The calculation may be written out by the pupil as follows:

$$\begin{array}{r} 2.3 \times \\ \underline{1.4} \\ .92 \\ \underline{2.3} \\ \underline{\underline{3.22}} \end{array}$$

Again, the position of the groups of unit indicators illustrated at C corresponds closely with the location of the individual digits as written out above.

Figure 6A:
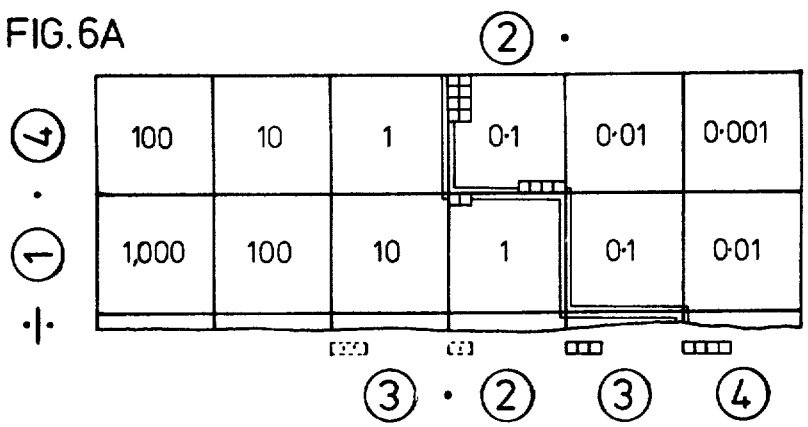
FIG. 6 illustrates three stages A, B and C in the division of 3.234 by 1.4 using the display board of FIG. 2.
Figure 6B:
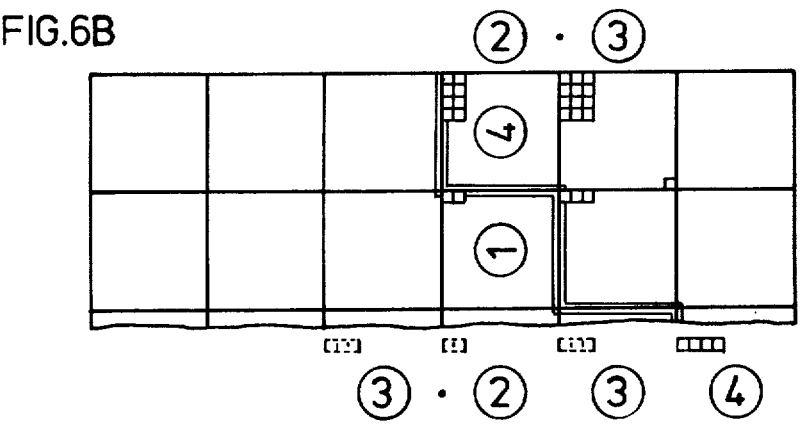
Figure 6C:
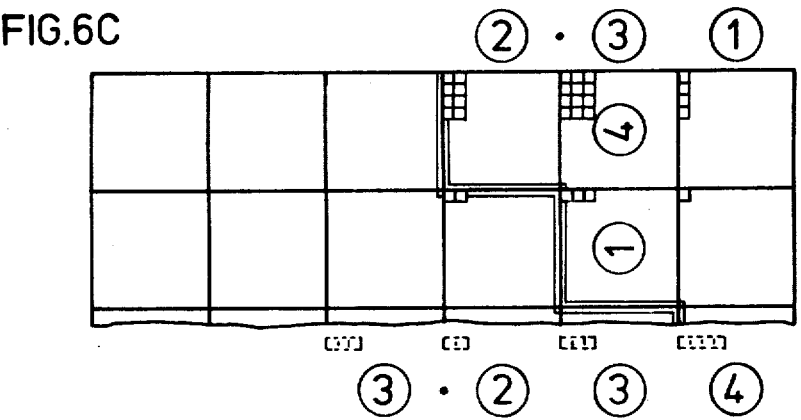

FIG. 6 illustrates the division of 3.234 by 1.4 using the display board illustrated in FIG. 2. The problem is set up as indicated and worked in the manner described with reference to FIG. 4.

The invention has been specifically described with reference to various calculations made according to arithmetic base ten in which ten yellow unit indicators are equal in value to one blue indicator and ten blue unit indicators are equal to one red unit indicator. If it is desired to work according to any other base, it is merely necessary to adjust the equivalence between the values of the different colours of the unit indicators. Thus for example for calculations in a system to base seven, seven yellow unit indicators would be given the same value as one blue, and seven blue as one red. The markings 1, 10 etc. on the display board would of course remain the same.

I claim:

1. An arithmetical teaching aid including a display board comprising a rectangular array of display areas arranged in columns and rows, adjacent display areas being marked to represent successive powers of an arithmetic base number so that display areas (where there are more than one) representing a given power of the base number are arranged diagonally across the board, means for relatively moving the various rows of area displays so that displays in the different rows corresponding to the same power of the base number can be brought into columnar registration, wherein all display areas corresponding to a given power of the base number have a common tonal and/or textural characteristic which is different from the characteristic of the or each neighbouring display area corresponding to a different power of the base number and wherein the teaching aid further comprises sets of unit indicators for display on said display areas each unit indicator having a tonal and/or textural characteristic identifiable with a said display area on which it is to be placed.

2. A teaching aid according to claim 1, wherein there are three distinct identifiable pairs of tonal and/or textural characteristics of the display areas and unit indicators arranged to correspond to three successive powers of the base number.

3. A teaching aid according to claim 1 or 2, wherein said unit indicators are uniformly sized cubes.

4. A teaching aid according to claim 3, wherein the display areas are square and of a uniform size, their sides corresponding to a whole number multiple of the length of an edge of the indicator cubes.

5. A teaching aid according to claim 4, wherein said whole number multiple is ten.

6. A teaching aid according to claim 1, wherein the various display areas are marked using the digits 1 and 0 only.

7. A teaching aid according to claim 1, wherein said display areas are market in positive powers and zero power only of the base number.

8. A teaching aid according to claim 1, wherein different display areas are marked in positive and negative powers of the base number.

9. A teaching aid according to claim 1, wherein said teaching aid includes two said rectangular arrays of display areas, and display areas of one such array being marked in positive powers and zero power only of the base number and the display areas of the other said array being marked in positive and negative powers of the base number.

10. A teaching aid according to claim 1, wherein there are additionally provided digitally marked counters.

* * * * *